United States Patent [19]

Cunningham et al.

[11] Patent Number: 5,547,728

[45] Date of Patent: Aug. 20, 1996

[54] OPTICAL RECORDING ELEMENTS HAVING RECORDING LAYERS CONTAINING MIXTURES OF FORMAZAN AND CYANINE DYES

[75] Inventors: Michael P. Cunningham; Steven Evans, both of Rochester, N.Y.

[73] Assignee: Eastman Kodak Company, Rochester, N.Y.

[21] Appl. No.: 380,490

[22] Filed: Jan. 30, 1995

Related U.S. Application Data

[63] Continuation-in-part of Ser. No. 311,071, Sep. 23, 1994, abandoned.

[51] Int. Cl.$^6$ ............................................. B32B 3/00
[52] U.S. Cl. .................... 428/64.1; 428/64.2; 428/64.4; 428/64.8; 428/913; 430/270.1; 430/270.11; 430/270.14; 430/496; 430/945; 430/495.1; 369/283; 369/288
[58] Field of Search ............................ 428/64.1, 64.2, 428/64.4, 64.8; 430/270, 495, 945, 270.1, 270.11, 270.14; 369/283, 288

[56] References Cited

U.S. PATENT DOCUMENTS

| | | | |
|---|---|---|---|
| 4,940,618 | 7/1990 | Hamada et al. | 428/64 |
| 5,294,471 | 3/1994 | Evans et al. | 428/64 |

FOREIGN PATENT DOCUMENTS

| | | |
|---|---|---|
| 2005520 | 6/1992 | Canada . |
| 0353393 | 2/1992 | European Pat. Off. . |

*Primary Examiner*—Newton Edwards
*Assistant Examiner*—Elizabeth Evans
*Attorney, Agent, or Firm*—John R. Everett

[57] ABSTRACT

An optical recording element having a transparent substrate and on the surface of said substrate, a recording layer and a light reflecting layer wherein recording layer comprises a mixture of a metallized formazan dye and cyanine dye and the unrecorded layer is such that the real part of the refractive index (N) at 780 nm is not less than 1.8 and the imaginary part (k) is not greater than 0.2.

10 Claims, No Drawings

OPTICAL RECORDING ELEMENTS HAVING RECORDING LAYERS CONTAINING MIXTURES OF FORMAZAN AND CYANINE DYES

CROSS-REFERENCE TO RELATED APPLICATIONS

This is a continuation-in-part of application Ser. No. 08/311,071, filed Sep. 23, 1994 entitled "Optical Recording Elements Having Recording Layers Containing Mixtures of Formazan and Cyanine Dyes" by Michael Cunningham and Steven Evans now abandoned.

FIELD OF THE INVENTION

The present invention relates to optical recording elements, including recordable optical compact disks.

BACKGROUND OF THE INVENTION

There are many types of known optical recording elements. In many of the elements, the mode of operation requires a recording layer having a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

In Japanese KOKAI 62-144997 there is described an optical recording element having a recording layer having a formazan-nickel complex. However, all of the complexes disclosed in this reference are bidentate and have a low index of refraction at about 780 nm and a low extinction coefficient.

It is desirable to produce optical recording media which, when recorded in real time, produce a record that mimics the conventional CD on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Elements of this type are described in U.S. Pat. No. 4,940,618, European Patent Application 0,353,393 and Canadian Patent Application 2,005,520.

Commercially useful materials of the type described in these references have stringent requirements. The recording layer must be able to couple with incident laser irradiation to provide features having sufficient reflectivity. The layer must also have good stability towards light, heat and humidity for acceptable shelf life. Since the Photo CD is a consumer product, it must be capable of withstanding extreme environments. Between the time the original images are recorded on the Photo CD and the time subsequent images are recorded, the CD might be placed in strong sunlight.

In the U.S. and the European applications mentioned above, the preferred dyes for the recording layer are indodicarbocyanine dyes. However, this type of dye has less than the desired light stability and will in fact fade to an unusable state after only a few days of intense sunlight exposure.

Optical recording layers containing metallized formazan dyes are disclosed in U.S. Pat. No. 5,294,471. These recording layers do not have sufficient capability to couple with incident laser irradiation to form the necessary contrast and sensitivity.

Thus, there is a continuing need for optical recording materials that have the necessary optical characteristics so that they are CD compatible, can couple with incident laser irradiation to form features with sufficient contrast and yet are light stable. It is to a solution to this problem that the present invention is directed.

SUMMARY OF THE INVENTION

The present invention provides an optical recording element having a transparent substrate and on the surface of said substrate, a recording layer and a light reflecting layer wherein recording layer comprises a mixture of a metallized formazan dye and cyanine dye and the unrecorded layer is such that the real part of the refractive index (N) at 780 nm is not less than 1.8 and the imaginary part (k) is not greater than 0.2.

The dye mixture in the recording layer boosts the activity of the recording layer beyond that attainable by the formazan alone and stabilizes the layer against light fade compared to cyanine dyes alone. The invention describes, therefore, a recording element combining two active recording materials.

DETAILED DESCRIPTION OF THE INVENTION

Any cyanine dyes should be useful as long as the resulting mixture has the refractive index attributes mentioned above. A particularly useful group of such dyes are indodicarbocyanine dyes. Representative examples of such dyes are presented hereinafter in connection with the examples.

The preparation of the formazan in this invention are prepared according to the methods described in U.S. Pat. No. 5,294,471.

Representative metallized formazan dyes fall within the scope of structure (I):

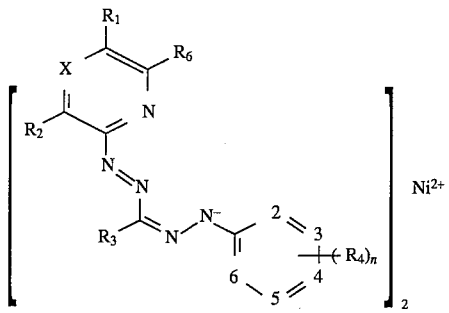

R$_1$ represents hydrogen, nitro, alkylsulfamoyl, arylsulfamoyl, dialkylsulfamoyl, diarylsulfamoyl or arylalkylsulfamoyl or R$_1$ may be combined with R$_6$ to form a 6-membered aromatic ring;

R$_2$ represents hydrogen, alkyl, alkoxy or halogen;
R$_3$ represents hydrogen, alkyl, aryl or hetaryl;
R$_4$ represents hydrogen, acyloxy, alkoxy, aryloxy, alkylthio, arylthio, alkylsulfonyl, arylsulfonyl, alkylaminosulfonyl, arylaminosulfonyl, alkylsulfonylamino, arylsulfonylamino, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, nitro, trihalomethyl, alkyl, aryl, hetaryl, alkylureido, arylureido, succinimido or phthalimido;
R$_6$ represents hydrogen or may be combined with R$_1$ to form a 6-membered aromatic fused ring;
X represents CH or N; and
n represents an integer from 1 to 5; provided that
when R$_1$ is hydrogen, either X must be N or at least one of R$_4$ must be a nitro group in the 4 position.

Representative dyes falling within structure I are presented in Table 1.

TABLE 1

| Formazan | R1 | R2 | R3 | R4 | X | n |
|---|---|---|---|---|---|---|
| 1 | H | H | 3-C$_7$H$_{15}$ | 4-NO$_2$ | CH | 1 |
| 2 | NO$_2$ | OCH$_3$ | 3-C$_7$H$_{15}$ | 4-COOC$_2$H$_5$ | CH | 1 |
| 3 | NO$_2$ | H | m-OCH$_3$ Phenyl | 4-(2-C$_4$H$_9$) | CH | 1 |
| 4 | SO$_2$N(nBu)$_2$ | Cl | p-OCH$_3$ Phenyl | 4-COOC$_2$H$_5$ | CH | 1 |
| 5 | SO$_2$NHtC$_4$H$_9$ | OCH$_3$ | m-OCH$_3$ Phenyl | 4-COOH | CH | 1 |
| 6 | SO$_2$NHtC$_4$H$_9$ | OCH$_3$ | nC$_3$H$_7$ | 4-H | CH | 1 |
| 7 | NO$_2$ | H | o-Oallyl Phenyl | 4-(2-C$_4$H$_9$) | CH | 1 |
| 8 | SO$_2$NHtC$_4$H$_9$ | OCH$_3$ | m-OCH$_3$ Phenyl | 4-COOC$_2$H$_5$ | CH | 1 |
| 9 | NO$_2$ | OCH$_3$ | 3-C$_7$H$_{15}$ | 4-C$_2$H$_5$ | CH | 1 |
| 10 | H | H | 3-C$_7$H$_{15}$ | 4-NO$_2$ | H | 1 |
| 11 | SO$_2$NHtC$_4$H$_9$ | OCH$_3$ | m-CH$_3$ Phenyl | 4-COOC$_2$H$_5$ | CH | 1 |
| 12 | SO$_2$NHtC$_4$H$_9$ | OCH$_3$ | m-OCH$_3$ Phenyl | 4-CH$_2$CH$_3$ | CH | 1 |
| 13 | H | H | 3-C$_7$H$_{15}$ | 2-SO$_2$CH$_3$ 4-NO$_2$ | CH | 2 |
| 14 | SO$_2$NH-3-C$_7$H$_{15}$ | OCH$_3$ | p-OCH$_3$ Phenyl | 2-COOC$_2$H$_5$ | CH | 1 |
| 15 | SO$_2$NH-3-C$_7$H$_{15}$ | OCH$_3$ | m-CH$_3$ Phenyl | 4-COOC$_2$H$_5$ | CH | 1 |
| 16 | SO$_2$NHtC$_8$H$_{17}$ | CH$_3$ | p-OCH$_3$ Phenyl | 4-COOC$_2$H$_5$ | CH | 1 |
| 17 | SO$_2$NHtC$_4$H$_9$ | OCH$_3$ | Phenyl | 4-CH$_2$CH$_3$ | CH | 1 |
| 18 | SO$_2$NHt-C$_4$H$_9$ | OCH$_3$ | p-OCH$_3$ Phenyl | 3-OC$_2$H$_5$ | CH | 1 |
| 19 | H | OCH$_3$ | m-CH$_3$ Phenyl | 4-C$_2$H$_5$ | N | 1 |
| 21 | SO$_2$N(nBu)$_2$ | OCH$_3$ | p-OCH$_3$ Phenyl | 4-C$_2$H$_5$ | CH | 1 |
| 22 | SO$_2$NHtBu | OCH$_3$ | p-OCH$_3$ Phenyl | 4-C$_2$H$_5$ | CH | 1 |
| 23 | SO$_2$NHtBu | OCH$_3$ | p-OCH$_3$ Phenyl | 4-OCH$_3$ | CH | 1 |
| 24 | NO$_2$ | H | m-OC$_2$H$_5$ Phenyl | 4-(2-C$_4$H$_9$) | CH | 1 |
| 25 | NO$_2$ | H | 3-C$_7$H$_{15}$ | 4-C$_2$H$_5$ | CH | 1 |
| 26 | NO$_2$ | H | 3-C$_7$H$_{15}$ | 2-CO$_2$C$_2$H$_5$ | CH | 1 |
| 27 | SO$_2$NHtC$_8$H$_{17}$ | OCH$_3$ | p-OCH$_3$ Phenyl | 2-CO$_2$C$_2$H$_5$ | CH | 1 |
| 28 | SO$_2$NH-3-C$_7$H$_{15}$ | OCH$_3$ | m-CH$_3$ Phenyl | 4-C$_2$H$_5$ | CH | 1 |
| 29 | SO$_2$NHtC$_8$H$_{17}$ | CH$_3$ | p-OCH$_3$ Phenyl | 4-C$_2$H$_5$ | CH | 1 |
| 30 | SO$_2$NHtC$_4$H$_9$ | OCH$_3$ | Phenyl | 4-(2-C$_4$H$_9$) | CH | 1 |
| 31 | NO$_2$ | H | m-O$_2$CtBu | 4-(2-C$_4$H$_9$) | CH | 1 |
| 32 | SO$_2$NHtC$_8$H$_{17}$ | OCH$_3$ | m-CH$_3$ Phenyl | 4-C$_2$H$_5$ | CH | 1 |
| 33 | SO$_2$NHCH(CH$_3$)CH$_2$OCH$_3$ | OCH$_3$ | m-OCH$_3$ Phenyl | 2-CO$_2$C$_2$H$_5$ | CH | 1 |
| 34 | SO$_2$NHtBu | CH$_3$ | p-OCH$_3$ Phenyl | 4-C$_2$H$_5$ | CH | 1 |
| 35 | SO$_2$NHtC$_8$H$_{17}$ | Cl | p-OCH$_3$ Phenyl | 4-CO$_2$C$_2$H$_5$ | CH | 1 |

TABLE 1-continued

| Formazan | R1 | R2 | R3 | R4 | X | n |
|---|---|---|---|---|---|---|
| 36 | | | | | | |
| 37 | | | | | | |

Another representative group of metallized formazan dyes fall within the scope of structure (II)

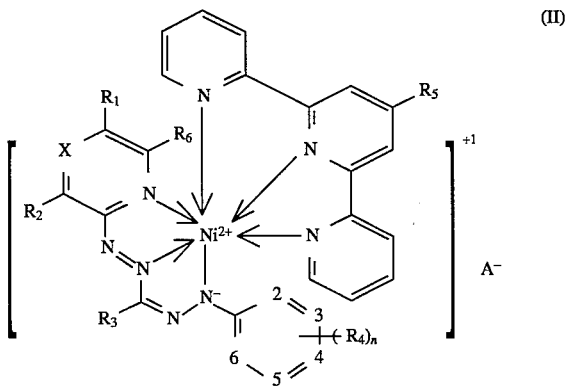

(II)

$R_1$ represents nitro, alkylsulfamoyl, arylsulfamoyl, dialkylsulfamoyl, diarylsulfamoyl or arylalkylsulfamoyl or $R_1$ may be combined with $R_6$ to form a 6-membered aromatic ring;
$R_2$ represents hydrogen, alkyl, alkoxy or halogen;
$R_3$ represents hydrogen, alkyl, aryl or hetaryl;
$R_4$ represents hydrogen, acyloxy, alkoxy, aryloxy, alkylthio, arylthio, alkylsulfonyl, arylsulfonyl, alkylaminosulfonyl, arylaminosulfonyl, alkylsulfonylamino, arylsulfonylamino, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, nitro, trihalomethyl, alkyl, aryl, hetaryl, alkylureido, arylureido, succinimido or phthalimido;
$R_5$ represents hydrogen, alkyl, aryl or alkoxy;
$R_6$ represents hydrogen or may be combined with $R_1$ to form a 6-membered aromatic fused ring;
X represents CH or N; provided that
  when $R_1$ is hydrogen, either X must be N or at least one of $R_4$ must be a nitro group in the 4 position; or
n represents an integer from 1–5;
and $A^-$ represents a monovalent anion such as halide, fluoroborate, tetraphenylborate, perchlorate, alkylsulfonate or arylsulfonate.
Table 2 presents useful dyes within structure II.

TABLE 2

| Formazan | R1 | R2 | R3 | R4 | R5 | $A^-$ |
|---|---|---|---|---|---|---|
| 20 | $SO_2NHtC_4H_9$ | $OCH_3$ | p-Cl Phenyl | $4-NO_2$ | $OC_2H_4NHCOC_7H_{15}$-n | $BF_4^-$ |
| 38 | $SO_2NHtC_4H_9$ | $OCH_3$ | p-$OCH_3$ Phenyl | $4-CO_2C_2H_5$ | $OC_2H_4NHCOC_7H_{15}$-n | $BF_4^-$ |
| 39 | $SO_2NHtC_4H_9$ | $OCH_3$ | p-$OCH_3$ Phenyl | $2-CO_2C_2H_5$ | $OC_2H_4NHCOC_7H_{15}$-n | $BF_4^-$ |

TABLE 2-continued

| Formazan | R1 | R2 | R3 | R4 | R5 | A⁻ |
|---|---|---|---|---|---|---|
| 40 | Formazan 40 | | | | | |

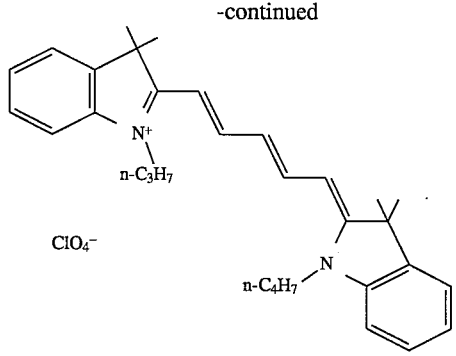

In the definitions of structures I and II alkyl means 1–12 carbons (including cycloalkyl of 5–7 carbons), aryl means 6–10 carbon atoms, alkoxy means 1–12 carbons and hetaryl means 5–10 membered unsaturated rings with at least one heteroatom.

In addition, each of the alkyl, cycloalkyl, aryl, hetaryl and alkoxy groups may be further substituted with one or more groups chosen from hydroxy, acyloxy, alkoxy, aryloxy, alkylthio, arylthio, alkylsulfonyl, arylsulfonyl, thiocyano, cyano, nitro, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, carboxy, trihalomethyl, alkyl, aryl, hetaryl, alkylureido, arylureido, succinimido, phthalimido and the like.

Light Stability Test

The light stability of compositions containing the above metallized formazans was evaluated by preparing 5:1 mixtures of the aforementioned formazans with typical cyanine dyes hereafter referred to as CD-1, CD-2, CD-7 and C118. These cyanine dyes have the following structures:

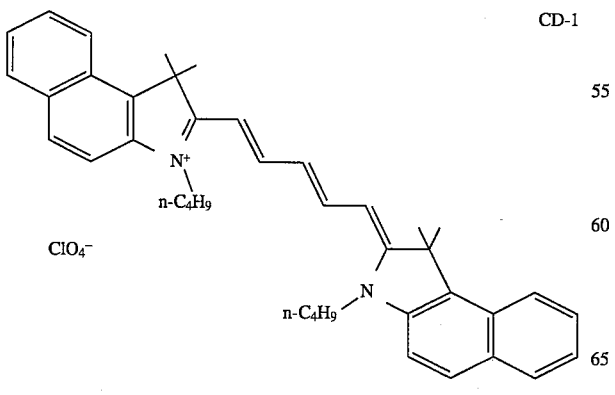

CD-1

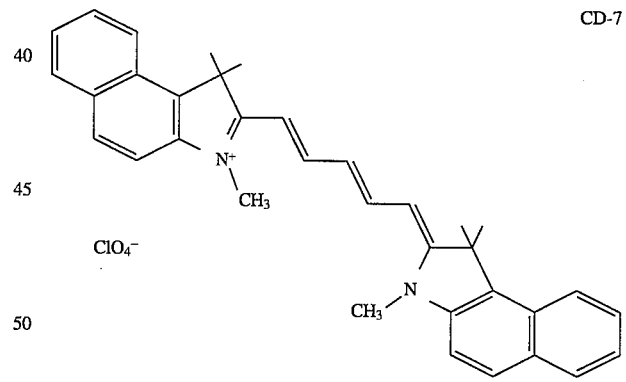

CD-2

CD-7

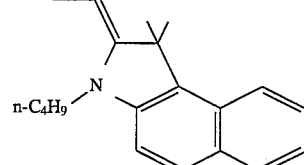

C118

The mixture was dissolved in 2,2,3,3-tetrafluoro-1-propanol at 2% solids and spun coated on 2"×2" pieces of polycarbonate at 600 rpm. After drying, the spectra of the resulting films was measured and the absorbance at the wavelength corresponding to that of maximum absorbance of CD-1 (714 nm) was recorded. The films were then exposed to a 50 Klux high intensity daylight source for periods extending to 14 days, the absorbance loss (at 714 nm) noted after each increment of exposure.

The percent losses noted for compositions containing CD-1 and the formazans listed in Table 1 were:

| Formazan | 7 days | 14 days |
|---|---|---|
| Control (None) | 100 | 100 |
| 1 | 7.3 | 13.0 |
| 2 | 8.9 | 15.0 |
| 3 | 10.8 | 19.7 |
| 4 | 11.7 | 21.1 |
| 5 | 17.4 | 26.3 |
| 6 | 19.7 | 33.0 |
| 7 | 19.8 | 32.4 |
| 8 | 19.8 | 32.8 |
| 9 | 20.5 | 32.2 |
| 10 | 22.3 | 36.2 |
| 11 | 22.9 | 37.3 |
| 12 | 26.1 | 42.0 |
| 13 | 12.8 | 23.3 |
| 14 | 19.4 | 33.0 |
| 15 | 20.5 | 35.6 |
| 16 | 21.1 | 36.6 |
| 17 | 38.9 | 73.2 |
| 18 | 23.3 | 35.2 |
| 19 | 17.4 | 29.9 |

The percent loss noted for a composition containing CD-1 and one of the formazans listed in Table 2 was:

| Formazan | 7 dats | 14 days |
|---|---|---|
| 20 | 12.9 | 14.4 |

In control compositions containing only CD-1 the loss was 100 percent.

Light Stability Test 2

The light stability of additional compositions containing the above metallized formazans and cyanine dye CD-1 was evaluated as in the above Light Stability Test 1, except the formazan:CD-1 ratio was 1:1 and the test samples were irradiated for 3 days. The following results were obtained.

| Formazan | % Fade after 3 Days |
|---|---|
| 21 | 20 |
| 22 | 18 |
| 23 | 15 |
| 24 | 67 |
| 25 | 7 |
| 26 | 2 |
| 27 | 6 |
| 28 | 8 |
| 29 | 17 |
| 30 | 14 |
| 31 | 6 |
| 32 | 13 |
| 33 | 5 |
| 34 | 16 |
| 35 | 30 |
| 36 | * |
| 38 | 7 |
| 39 | 15 |
| 40 | 59 |
| Control (no formazan) | 100 (total fade) |

*Dye was not sufficiently soluble to be evaluated.

Optical Recording Elements

The optical elements of the invention comprise a light transmitting, typically pregrooved substrate, a light absorptive layer comprising a cyanine dye admixed with a metallized formazan dye overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (N) of the unwritten light absorptive layer measured with a 780 nm light source is not less than 1.8 and the imaginary part (k) is not greater than 0.2.

The substrate may be any transparent material that satisfies the mechanical and optical requirements. The substrates are generally pregrooved with groove depths from 20 nm to 250 nm, groove widths 0.2 to 1 μm and a pitch 1 to 2 μm. The preferred material is polycarbonate, other materials are glass, polymethylmethacrylate and other suitable polymeric materials.

The preparation of the optical recording element of the invention is achieved by spin coating of the dye mixture, or with other dye or dyes or with addenda from a suitable solvent onto a transparent substrate. For coating, the dye mixture with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methoxy-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum and copper and alloys thereof.

The protective layer over the reflective layer is similarly conventional for this art. Useful materials include UV curable acrylates.

One preferred protective layer is disclosed in commonly assigned U.S. patent application 815,020, filed Dec. 27, 1991 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat.No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Representative metallized formazans from Tables 1 and 2 were combined with a cyanine dye to form optical recording layers and optical recording elements. For each of the recording layer mixtures studied, a series of mixtures were studied in which the cyanine dye to formazan ratio was varied so as to form an element capable of achieving the required refractive indices and reflectivity for optical data discs published in *International Standard* ISO/IEC 10149. The method was one in which the composition was dissolved in an appropriate solvent (typically 2,2,3,3-tetrafluoro- 1-propanol (TFP)) and spun coated onto silicon wafers. Spectroscopic ellipsometric analysis of the coated wafers provided the dispersion characteristics and the film thickness corresponding to the first reflectance maximum at 780 nm in a writeable CD element was calculated. The ratio of components was varied until the required reflectivity at 780 nm was achieved.

The following examples demonstrate the optical recording capability of the recording layer mixtures used in the elements of this invention.

Example 1. C118+Dye 1 (5:1)

A mixture of the C118 and dye 1 at a 5:1 ratio gave an index at 780 nm of 2.69-0.09i. A solution of the mixture at 3.5% solids in 1-methoxy-2-propanol was applied by spin coating to a grooved polycarbonate substrate typical of that used in the writeable CD industry using techniques well known to those skilled in the spin coating art. The substrate groove structure was 37 nm deep and 0.38 um wide and during coating the grooves were filled to afford of the above mixture at a conformity of 81%. A complete optical element was prepared by the application of 100 nm of gold by sputter followed by 5 um of SD-17 lacquer. The resulting disk was performance tested on a commercially available 2X writer available from N. V. Philips (MT-16 media tester). The substrate was wobbled and ATIP encoded as a 63 minute substrate. Testing at 2.8 m/s (2X) on the MT-16 afforded a disk which, when read out on a commercially available reader (CD-CATS) afforded high contrast marks which exceeded the ISO/IEC 10149 requirements (I3R=0.48, I11R=0.70) at a reflectivity of 75% and BLER of 4.

Example 2. CD-7+Dye 1 (5:1)

A mixture of CD-7 and dye 1 at a 5:1 ratio gave an index at 780 nm of 2.71-0.11i. A solution of the mixture at 2% solids in 2,2,3,3-tetrafluoro-1-propanol was spin coated in a manner similar to that described above except that the groove structure was 150 nm deep and 0.51 um wide. The substrate was wobbled and ATIP enclosed as a 63 minute substrate. During coating the grooves were filled to afford 154 nm of the above mixture at a conformity of 49%. A complete optical element was preparedby the application of 100 nm of gold by thermal evaporation followed by 5 um of SD-17 lacquer. The element was tested with an optical recording system based on a 780 nm diode laser while the disk spun at a constant linear velocity of 2.8 m/sec. Recording a pseudo random EFM pattern afforded high contrast marks which exceeded the ISO/IEC 10149 requirements (I3R=0.59, I11R=0.81 with low jitter (mark jitter 11 ns; land jitter 14 ns) and low non-linearity (47 ns)).

Example 3. C118+Dye 17

A mixture of C118 and dye 17 at a 6:4 ratio gave an index at 780 nm of 2.51-0.09i. A solution of the mixture at 4% solids in 1-methoxy-2-propanol was spin coated in a manner similar to that described above except that the groove structure was 37 nm deep and 0.31 um wide. During coating the grooves were filled to afford 125 nm of the above mixture at a conformity of 99%. A complete optical element was prepared by the application of 100 nm of gold by thermal evaporation followedby 5 um of SD-17 lacquer. Although the substrate was wobbled and ATIP encoded as a 63 minute substrate, the element was tested at a constant linear velocity of 2.4 m/sec. Recording a pseudo random EFM pattern afforded high contrast marks which exceeded the ISO/IEC 10149 requirements (I3R=0.37, I11R=0.66 with low jitter (mark jitter 17 ns; land jitter 22 ns) and low non-linearity (31 ns)).

Example 4. CD-7+Dye 3 (6:4)

A mixture of CD-7 and dye 3 at a 6:4 ratio gave an index at 780 nm of 2.54-0.12i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 145 nm of the above mixture at a conformity of 51%. A complete optical element was prepared by the application of 100 nm of gold by thermal evaporation followed by 5 um of SD-17 lacquer. The substrate was wobbled and ATIP enclosed as a 63 minute substrate and the element was tested at a constant linear velocity of 2.8 m/sec. Recording a pseudo random EFM pattern afforded high contrast marks which exceeded the ISO/IEC 10149 requirements (I3R=0.54, I11R=0.72 with low jitter (mark jitter 14 ns; land jitter 17 ns) and low non-linearity (53 ns)).

Example 5. CD-7+Dye 5 (7:3)

A mixture of CD-7 and dye 5 at a 7:3 ratio gave an index at 780 nm of 2.61-0.15i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 135 nm of the above mixture at a conformity of 51 %. A complete optical element was prepared by the application of 100 nm of gold by thermal evaporation followed by 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks which exceeded the ISO/IEC 10149 requirements (I3R=0.54, I11R=0.75 with low jitter (mark jitter 14 ns; land jitter 16 ns) and low non-linearity (45 ns)).

Example 6. CD-7+Dye 20 (6:4)

A mixture of CD-7 and dye 20 at a 6:4 ratio gave an index at 780 nm of 2.55-0.11i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 142 nm of the above mixture at a conformity of 48%. A complete optical element was prepared by the application of 100 nm of gold by thermal evaporation followedby 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks which exceeded the ISO/IEC 10149 requirements (I3R=0.46, I11R=0.70 with low jitter (mark jitter 14 ns; land jitter 17 ns) and low non-linearity (48 ns)).

Example 7. CD-7+Dye 19 (1:1)

A mixture of CD-7 and dye 19 at a 1:1 ratio gave an index at 780 nm of 2.60-0.11i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 135 nm of the above mixture at a conformity of 49%. A complete optical element was prepared by the application of 100 nm of gold by thermal evaporation followed by 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks which exceeded the ISO/IEC 10149 requirements (I3R=0.57, I11R=0.72 with low jitter (mark jitter 12 ns; land jitter 26 ns) and moderate non-linearity (98 ns)).

Example 8. CD-7+Dye 6 (1:1)

A mixture of CD-7 and dye 6 at a 1:1 ratio gave an index at 780 nm of 2.50-0.10i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 120 nm of the above mixture at a conformity of 52%. A complete optical element was prepared by the application of 100 nm of gold by thermal evaporation followed by 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks which exceeded the ISO/IEC 10149 requirements (I3R=0.44, I11R=0.62 with low jitter (mark jitter 15 ns; land jitter 26 ns) and moderate non-linearity (77 ns)).

Example 9. CD-7+Dye 8 (85:15)

A mixture of CD-7 and dye 8 at a 85:15 ratio gave an index at 780 nm of 2.71-0.08i. A solution of the mixture at 2% solids in 2,2,3,3-tetrafluoro-1-propanol was spin coated in a manner similar to that described above except that the groove structure was 150 nm deep and 0.51 um wide. During coating the grooves were filled to afford 161 nm of the above mixture at a conformity of 46%. A complete optical element was prepared by the application of 100 nm of gold by thermal evaporation followed by 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks which exceeded the ISO/IEC 10149 requirements (I3R=0.59, I11R=0.79 with low jitter (mark jitter 15 ns; land jitter 20 ns) and moderate non-linearity (58ns)).

Example 10. C118+Dye 7 (1:1)

A mixture of C118 and dye 7 at a 1:1 ratio gave an index at 780 nm of 2.49-0.08i. A solution of the mixture at 4% solids in 1-methoxy-2-propanol was spin coated in a manner similar to that described above except that the groove structure was 37 nm deep and 0.38 um wide. During coating the grooves were filled to afford 115 nm of the above mixture at a conformity of 100%. A complete optical element was prepared by the application of 100 nm of gold by thermal evaporation followed by 5 um of SD-17 lacquer. The substrate was wobbled and ATIP encoded as a 63 minute substrate and the element was tested at a constant linear velocity of 2.8 m/sec. Recording a pseudo random EFM pattern afforded high contrast marks (I3R=0.43, I11R=0.58) with low jitter (mark jitter 14 ns; land jitter 26 ns) and moderate non-linearity (64 ns).

The invention has been described with particular reference to preferred embodiments thereof but it will be understood that modifications can be made within the spirit and scope of the invention.

What is claimed is:

1. An optical recording element having a transparent substrate and on the surface of said substrate, a recording layer and a light reflecting layer wherein recording layer comprises a mixture of a metallized formazan dye and indodicarbocyanine dye and the unrecorded layer is such that the real part of the refractive index (N) at 780 nm is not less than 1.8 and the imaginary part (k) is not greater than 0.2.

2. The optical element of claim 1 wherein the metallized formazan dye has the structure I as follows:

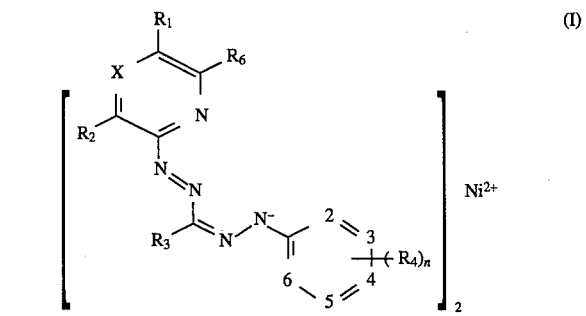

$R_1$ represents hydrogen, nitro, alkylsulfamoyl, arylsulfamoyl, dialkylsulfamoyl, diarylsulfamoyl or arylalkylsulfamoyl or $R_1$ may be combined with $R_6$ to form a 6-membered aromatic ring;

$R_2$ represents hydrogen, alkyl, alkoxy or halogen;

$R_3$ represents hydrogen, alkyl, aryl or hetaryl;

$R_4$ represents hydrogen, acyloxy, alkoxy, aryloxy, alkylthio, arylthio, alkylsulfonyl, arylsulfonyl, alkylaminosulfonyl, arylaminosulfonyl, alkylsulfonylamino, arylsulfonylamino, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, nitro, trihalomethyl, alkyl, aryl, hetaryl, alkylureido, arylureido, succinimido or phthalimido;

$R_6$ represents hydrogen or may be combined with $R_1$ to form a 6-membered aromatic fused ring;

X represents CH or N; and n represents an integer from 1 to 5; provided that when $R_1$ is hydrogen, either X must be N or at least one of $R_4$ must be a nitro group in the 4 position.

3. An element according to claim 2 wherein the metaliized formazan dye is selected from Table 1 herein.

4. an element according claim 2 wherein:

$R_1$ represents H, $NO_2$, SO2N(nBu)2, $SO_2NHtC_4H_9$, $SO_2NH$-2-$C_7H_{15}$ or $SO_2NHtC_8H_{17}$;

$R_2$ represents, H, Cl, $OCH_3$ or $CH_3$;

$R_3$ represents, 3-$C_7H_{15}$, m-$OCH_3$ Phenyl, p-$OCH_3$ Phenyl, n-$C_3H_7$, o-Oallyl Phenyl, m-$CH_3$ Phenyl or Phenyl;

$R_4$ represents 4-H, 4-$NO_2$, 4-$COOC_2H_5$, 4-(2-$C_4H_9$), 4-COOH, 4-$C_2H_5$, 4-$CH_2CH_3$, 2-$SO_2CH_3$, or 3-$OC_2H_5$;

$R_5$ represents H;

X represent CH or N; and n represents 1 or 2.

5. The element of claim 1 wherein the metallized formazan has the structure II as follows:

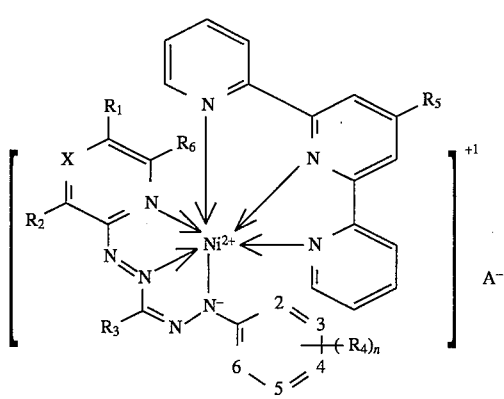

(II)

$R_1$ represents nitro, alkylsulfamoyl, arylsulfamoyl, dialkylsulfamoyl, diarylsulfamoyl or arylalkylsulfamoyl or $R_1$ may be combined with $R_6$ to form a 6-membered aromatic ring;

$R_2$ represents hydrogen, alkyl, alkoxy or halogen;

$R_3$ represents hydrogen, alkyl, aryl or hetaryl;

$R_4$ represents hydrogen, acyloxy, alkoxy, aryloxy, alkylthio, arylthio, alkylsulfonyl, arylsulfonyl, alkylaminosulfonyl, arylaminosulfonyl, alkylsulfonylamino, arylsulfonylamino, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, amino, alkylamino, arylamino, nitro, trihalomethyl, alkyl, aryl, hetaryl, alkylureido, arylureido, succinimido or phthalimido;

$R_5$ represents hydrogen, alkyl, aryl or alkoxy;

$R_6$ represents hydrogen or may be combined with $R_1$ to form a 6-membered aromatic fused ring;

X represents CH or N; provided that when $R_1$ is hydrogen, either X must be N or at least one of $R_4$ must be a nitro group in the 4 position; or n represents an integer from 1–5;

and $A^-$ represents a monovalent anion such as halide, fluoroborate, tetraphenylborate, perchlorate, alkylsulfonate or arylsulfonate.

6. An element according to claim 5 wherein the metallized formazan dye is selected from Table 2 herein.

7. The element of any one of claims 3, 6 or 4, wherein the cyanine dye is selected from the group consisting of

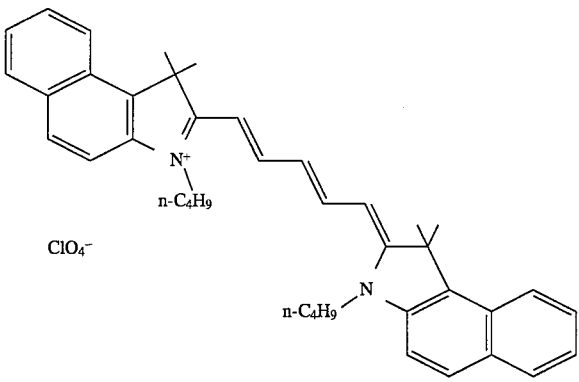

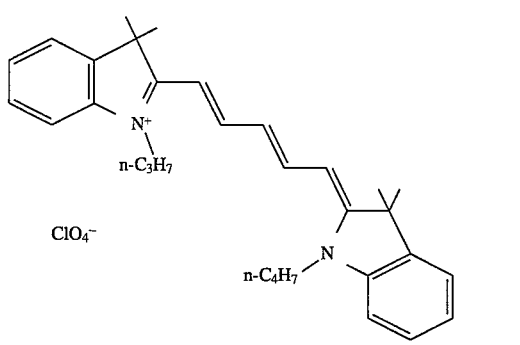

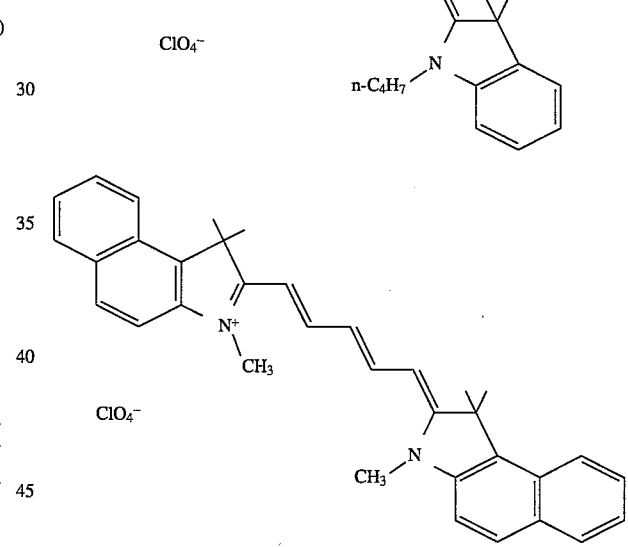

and

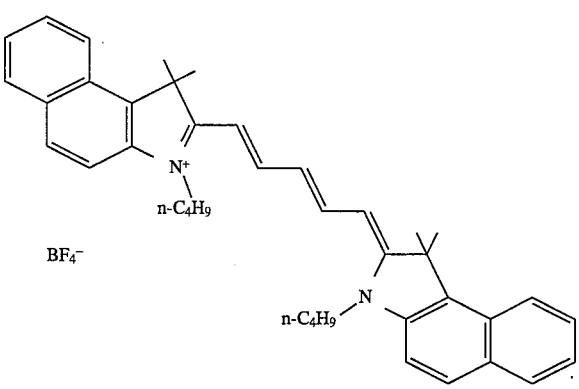

8. The element of claim of claim 1 having a recording layer comprising a mixture of dye 1 of Table 1 and a cyanine dye of the structure

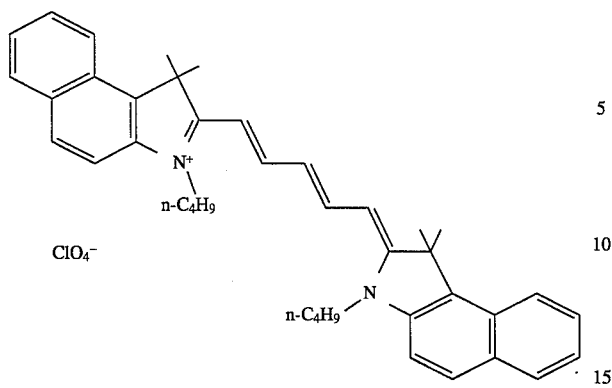
9. The element of claim 8 wherein the cyanine dye to metallized formazan dye ratio is 5:1.
10. The element of claim 1 wherein the cyanine dye is an indodicarbocyanine.
* * * * *